United States Patent
Henderson (10) Patent No.: US 11,436,996 B2
(45) Date of Patent: Sep. 6, 2022

(54) IMAGE PROCESSING SYSTEM AND METHOD

(71) Applicant: Sony Interactive Entertainment Inc., Tokyo (JP)

(72) Inventor: Christopher William Henderson, Londonberry (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/939,512

(22) Filed: Jul. 27, 2020

(65) Prior Publication Data
US 2021/0043162 A1 Feb. 11, 2021

(30) Foreign Application Priority Data
Aug. 5, 2019 (GB) ...................................... 1911150

(51) Int. Cl.
*G09G 5/10* (2006.01)
*A63F 13/537* (2014.01)
*G06T 5/00* (2006.01)

(52) U.S. Cl.
CPC .............. *G09G 5/10* (2013.01); *A63F 13/537* (2014.09); *G06T 5/007* (2013.01); *G09G 2320/0233* (2013.01); *G09G 2320/0613* (2013.01); *G09G 2320/10* (2013.01); *G09G 2340/14* (2013.01)

(58) Field of Classification Search
CPC .............. G09G 5/02; G09G 2320/0233; G09G 2320/0613; G09G 2320/10; G09G 2340/14; G09G 2320/0238; G09G 2320/0626; G09G 5/10; A63F 13/537; G06T 5/007
See application file for complete search history.

(56) References Cited

U.S. PATENT DOCUMENTS

| | | |
|---|---|---|
| 2002/0163596 A1 | 11/2002 | Griessl |
| 2004/0071210 A1 | 4/2004 | Amara |
| 2006/0115182 A1 | 6/2006 | Deng |
| 2007/0041656 A1 | 2/2007 | Clarke |
| 2012/0287251 A1* | 11/2012 | Paczkowski ......... H04N 13/341 348/51 |
| 2017/0150093 A1* | 5/2017 | Liu ........................ G11B 27/28 |

FOREIGN PATENT DOCUMENTS

WO     2007053075 A2     5/2007

OTHER PUBLICATIONS

Combined Search and Examination Report for corresponding GB Application No. GB1911150.9, 8 pages, dated Jan. 23, 2020.
Extended European Search Report for corresponding EP Application No. 20184490.9, 8 pages, dated Dec. 3, 2020.

* cited by examiner

*Primary Examiner* — Antonio A Caschera
(74) *Attorney, Agent, or Firm* — Matthew B. Dernier, Esq.

(57) ABSTRACT

A content processing system for modifying the brightness of one or more image frames of content, the system comprising a content analysis unit operable to identify brightness information for each of two or more image frames within the content, a variation detection unit operable to detect a variation in the brightness of at least two image frames within the content, and a brightness modification unit operable to modify the brightness of one or more image frames in dependence upon the detected brightness variation so as to reduce the variation in brightness between frames of the content.

11 Claims, 4 Drawing Sheets

IMAGE PROCESSING SYSTEM AND METHOD

BACKGROUND OF THE INVENTION

Field of the invention

This disclosure relates to image processing systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Over time the use of display technology, such as computers, games consoles, televisions, and mobile phones, has increased significantly. On average, people spend several hours a day looking at their mobile phones—and of course this figure increases substantially when extended to include computers and televisions. One study concluded that the average person in the UK spends six hours a day looking at screens, with almost a quarter of people spending at least 10 hours a day looking at screens.

The context in which these screens are being used has also changed over the years; it is now increasingly common to use bigger displays (such as projectors or large televisions) and/or displays that are provided closer to the viewer's eyes (such as mobile phones, or head-mountable displays). This results in the display occupying a far greater proportion of the user's field of view than was previously common, and as such the manner in which the content is provided may be much more impactful.

It is therefore apparent that continued use of screens can result in problems such as eye fatigue, or even eye strain in more extreme cases. Modifications to the manner in which content is provided via a display may therefore be considered useful to improve user comfort.

One example of a modification that has become common in view of these concerns is that of a blue-light filter. Many devices, such as mobile phones, have applications installed which cause the display to use less blue light than would otherwise be displayed—this may be activated by a user manually, or be implemented full-time or between certain hours (such as between sunset and sunrise). This is intended to provide less visual stimulation to a viewer, which may improve their ability to sleep despite heavy use of devices in the evening before going to bed.

In view of the above discussion, it is therefore apparent that modifications to the display of content so as to enable an improvement in user comfort when viewing that content may be considered desirable.

It is in the context of the above problems that the present disclosure arises.

SUMMARY OF THE INVENTION

This disclosure is defined by claim 1.

Further respective aspects and features of the disclosure are defined in the appended claims. It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Referring now to the drawings, wherein like reference numerals designate identical or corresponding parts throughout the several views, embodiments of the present disclosure are discussed.

In embodiments of the present disclosure, image content is processed so as to reduce the variation in brightness that may occur between consecutive frames or groups of frames of image content. Image content here may refer to any suitable sequence of images, such as a slideshow, video content, or computer-generated content (such as the output from a video game).

In the present disclosure, the terms 'brightness' and 'luminance' may be used interchangeably; while the former is a subjective measure of the latter, in the present disclosure it is the variation in the brightness/luminance that is considered and as such either approach can be used to characterise the content.

Figure 1A:
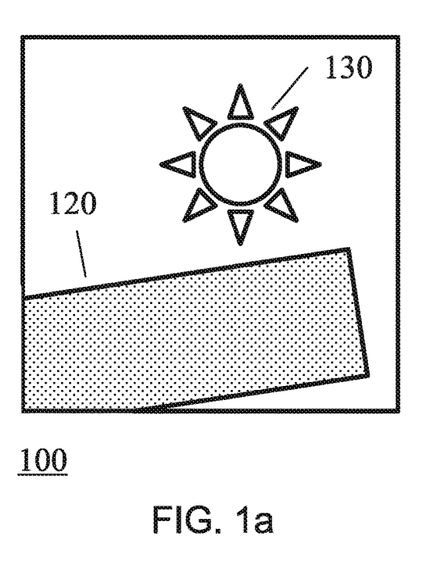
FIGS. 1a and 1b schematically illustrate an example of a brightness variation.
Figure 1B:
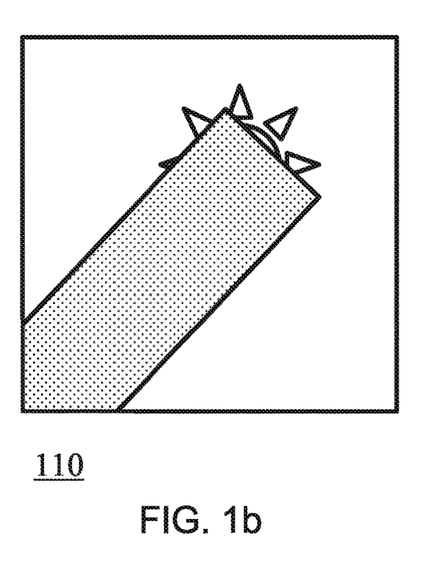

FIGS. 1a and 1b schematically illustrate an example of such a brightness variation. FIGS. 1a and 1b may be considered to be consecutive frames 100 and 110 of content. In the first frame 100, a helicopter blade (an example of an obstacle) 120 is oriented along the bottom of the frame and the viewer is presented with an unobstructed view of the sun (an example of a light source) 130. In the second frame 110, the helicopter blade 120 has moved so as to obscure the sun 130; this would generally result in a darker image being displayed, as the viewer would no longer have a direct view of the light source 130.

Such a variation in brightness may cause a user to experience some discomfort, and may provide a burden on the user's vision that could cause their eyes to become more fatigued due to having to adjust the variation. It may therefore be considered advantageous to be able to perform processing on the image content so as to reduce this variation in brightness.

Figure 2:
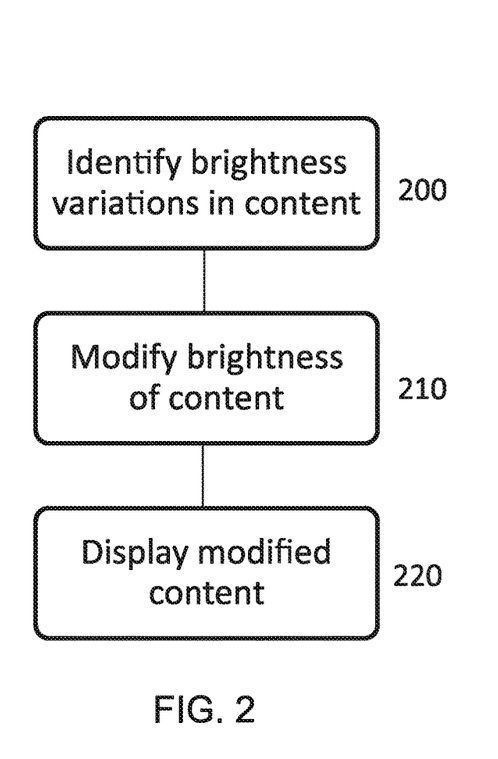
FIG. 2 schematically illustrates a content modification and display method.

FIG. 2 schematically illustrates a content modification and display method that is operable to provide display content with a reduced variation in brightness.

At a step 200, identification of the brightness variations within the content is performed. This may be performed in a number of ways; for example, the brightness of each frame may be determined by performing image processing on each frame. Similarly, the brightness may be calculated on a per-frame-group (such as a group of 3, 4, or 5 frames) basis.

This brightness information may be further used to generate a rolling average of the brightness of the content over a number of frames (or frame groups). This may assist in characterising the variation of the brightness of image frames over time, as the impact of outlying frames (in respect of their brightness) on the analysis can be mitigated. Additional variables may also be identified at this stage, such as the contrast of one or more frames or higher-level variables such as the frame rate and/or image quality of the content.

In some embodiments, processing is performed to identify a measure of the overall brightness of an image frame (for example, by summing or averaging the brightness of each pixel within the frame), while in others only the brightness of a particular region (such as the centre of the image, or an area of focus) is considered.

Brightness information may also be obtained from metadata associated with the content, or may be derived from information used in generating the image content (such as outputting information used in generating video game content).

At a step 210, the brightness of the content is modified. This may be performed in a number of ways, many of which are described below, with the result being that content is generated (referred to as modified content) in which the variation in brightness between consecutive frames or groups of frames is reduced.

At a step 220, the modified content is displayed to a viewer via a suitable display device. Suitable display devices may include any portable processing devices (such as mobile phones), head-mountable displays, or televisions/computer monitors. Of course, in some embodiments this step is optional; the modified content may instead be stored for later use (for example, on a server or on a removable storage device), or may be transmitted to a separate device for further processing and/or display.

Figure 3:
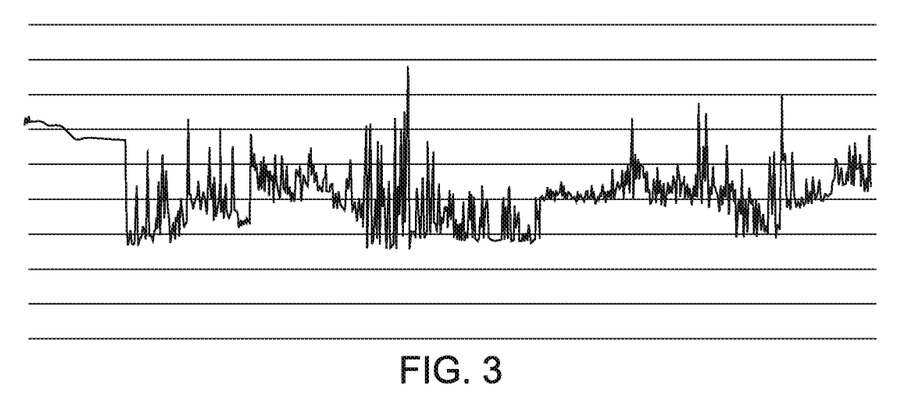
FIG. 3 schematically illustrates a graph of the luminance of each image frame within a sequence.

As noted above, numerous methods for modifying the brightness variation within content may be considered appropriate. FIG. 3 schematically illustrates an example of brightness or luminance data for each frame of image content (with the value on the horizontal axis being the frame number). As noted above, this luminance data may be generated in any suitable manner, such as by calculating an overall luminance value for the image frame as a whole.

It is apparent from FIG. 3 that there are significant variations in the brightness at several points in the plot; that is to say that there are large vertical distances between a number of subsequent peaks and troughs of the plot. It is primarily these larger variations that are to be addressed by the methods for modifying the brightness variations, although processing may be applied in a manner so as to modify the brightness variation between every frame, or at least a significant portion of the frames in the content.

Figure 4:
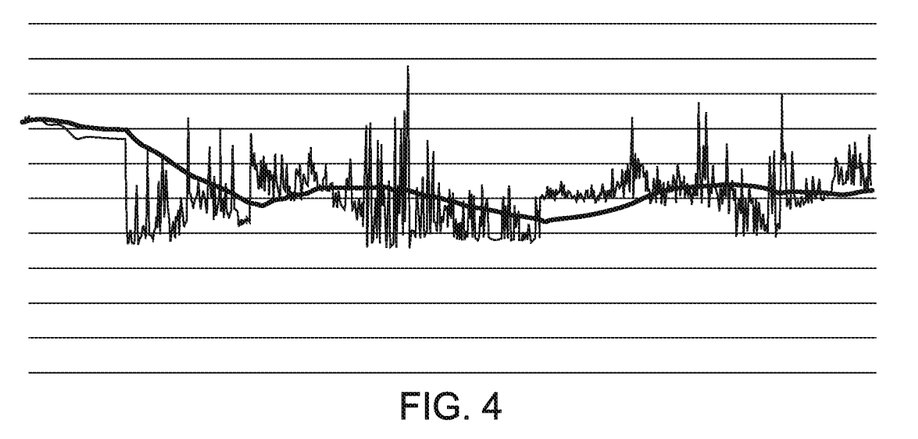
FIG. 4 schematically illustrates the graph of FIG. 3 with an overlaid trend line of the luminance.
Figure 5:
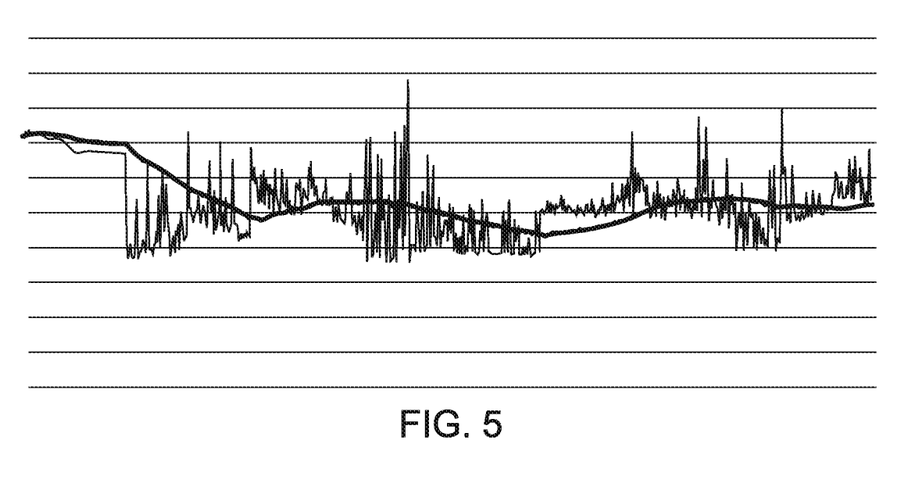
FIG. 5 schematically illustrates the graph of FIG. 4 with an overlaid representation of the luminance of the adjusted image frames within the sequence.

In order to illustrate the first example of such a brightness variation modification method, reference is made to FIGS. 4 and 5. FIG. 4 schematically illustrates the plot of FIG. 3, with the addition of an overlaid trend line representing the average luminance of image frames over time. This trend line may be generated by calculating a rolling average of the luminance for a plurality of frames—for example, the current frame and the preceding three frames, or the current frame and the two frames either side of the current frame. Any suitable selection of frames for generating the average may be considered suitable in the present case.

In the first exemplary method, the brightness of each frame in the content is modified in dependence upon the brightness of the frame relative to the value of the average luminance (for example, as calculated for that particular frame or for a previous frame). Frames with luminance values that are above the trend line (those with a higher luminance value) are processed so as to reduce their brightness, while frames with values below the trend line (those with a lower luminance value) are processed so as to increase their brightness.

In some embodiments, this processing is performed so as to scale the brightness of each frame relative to a reference value; this may be an effective method of reducing the magnitude of the brightness variation between frames whilst maintaining the effect of the brightness variation. The outcome of such a process is illustrated in FIG. 5; this Figure illustrates the plot and trend line of FIG. 4, with an additional plot that represents the adjusted luminance values.

This additional plot very closely aligns with the trend line, by virtue of reducing the difference between the trend luminance value and frame luminance value to a small percentage of the original value. The plot of the luminance associated with each frame appears as an almost-smooth curve, which is a clear indication of a significant reduction in the variation of brightness between frames relative to the original plot of luminance values for each frame as discussed with reference to FIG. 3. It would therefore be expected that content which has been processed to vary the brightness values for each frame from those in FIG. 3 to those of the plot of FIG. 5 would provide a user with a more comfortable viewing experience.

Alternatively, or in addition, the processing may be performed so as to add a fixed value of luminance of each frame that is below the trend line, and to subtract it (or a separate value) from the luminance value of each frame that is above the trend line. The value may be selected so as to vary with the difference between the trend and frame luminance values where appropriate, so as to assist in preserving the relative brightness of frames (that is, to reduce the chance of a frame going from being lighter than the preceding frame to being darker than the preceding frame due to different applied luminance modification values). This would also preserve the effect of the brightness variation, whilst reducing the magnitude of that variation.

Figure 6:
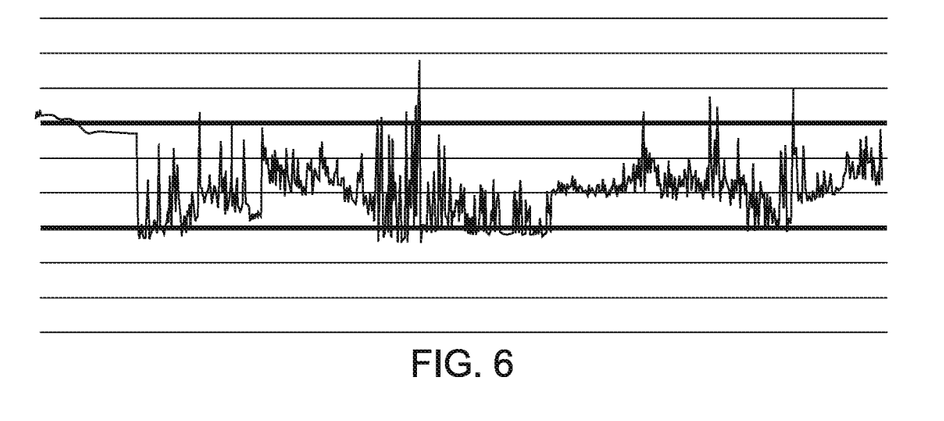
FIG. 6 schematically illustrates the graph of FIG. 3 with overlaid thresholds.

In a second example, modifications to the brightness of one or more of the image frames are applied in dependence upon whether or not they meet or exceed a higher threshold value or whether they meet or fail to exceed a lower threshold value. For example, FIG. 6 schematically illustrates the plot of FIG. 3 with upper and lower thresholds applied—any frames with luminance values below the lower threshold value may be modified to increase the luminance values to the lower threshold value (or any other suitable value). Similarly, those frames with luminance values which exceed the upper threshold value may be modified to cap the luminance values to the upper threshold value (or any other suitable value).

In some embodiments, these threshold values may be determined in dependence upon an average brightness of the content, for example, or so as to reduce the number of frames which would have to be modified so as to fit within the threshold values. The difference between the thresholds may be determined based upon requirements for user comfort or the like. For example, a maximum brightness variation may be defined by a user and the threshold values can be set so as to accommodate this in a suitable manner.

In a third example, the contrast of one or more image frames may be modified so as to increase or reduce the contrast of the image frame (as appropriate). This may represent a more indirect method of reducing the brightness variation between frames. For example, brighter frames may have the contrast lowered, while darker frames may have the contrast increased. In doing this, the brightness range of the image may be decreased (or increased, as appropriate) which may give the impression of varying the overall brightness of the image frame. The selection of which frames to be modified in this example may be performed in any suitable manner—for example, the selection could be performed in line with the above examples.

In some cases, combinations of the above methods may be applied; for instance, the first and second examples could be combined so as to generate a smoothed brightness variation between frames to which thresholds could be applied to ensure that brightness limits are not exceeded. Of course, other alternative (or additional) methods for modifying the brightness of the content may be utilised where appropriate.

While the above comments have been made in respect of the modification of the brightness of video content or other content comprising a sequence of images, these methods may be equally applicable to other sources of image content. For example, video games may be an appropriate source of image content.

In embodiments in which video games are used as the source of image content, the brightness variation reducing process may be performed at any suitable stage within the image generation process.

For example, the brightness detection may be applied to a scene to be rendered, or to a viewport to be rendered, before any images are generated. This may be considered an example of identifying brightness information for images in the content, even if the identification is performed before the image is rendered. An advantage of performing the identification earlier in the process is in that of being able to modify the brightness as a part of the rendering process, either by modifying pixel values or by modifying the content being rendered (such as vary light source brightness within the content, for example via the game code)—the performing of image manipulation (so as to modify the brightness) may be omitted or simplified in such cases.

Alternatively, or in addition, the brightness variation reducing process may be performed in respect of each frame as it is rendered or to be displayed—this method would be considered analogous to the method described above.

In either case, it is anticipated that a number of features may be implemented to improve the brightness variation reducing process.

For example, metadata may be provided that identifies brightness information for the content. This may comprise a time track indicating brightness at each time within the content, brightness information for each frame, the average brightness for the content as a whole (or for two or more portions of the content) or any other suitable brightness information so as to reduce the amount of processing required to identify the brightness of frames of content. This information may be obtained via pre-processing of the content, for example, or it may be output by the image generating process.

In some embodiments, it is considered that pre-processing of the content may be performed so as to generate information regarding the brightness variation, rather than just the brightness information for one or more image frames, or even to generate information identifying the brightness modification that should be performed for one or more image frames.

Rather than using metadata, it may be possible in some embodiments to encode a brightness indication into the image itself; for example, a designated pixel could be provided in each image frame that has a brightness value, colour, or any suitable characteristic, that is defined so as to be representative of the brightness of the image frame or the modification that should be applied.

In some embodiments, for example those in which the brightness variation reducing process is being performed in real-time during playback of the content, it may be considered advantageous to reduce the amount of processing that is performed. Listed below are examples of methods that may reduce the processing burden of such methods.

A first example of a method to reduce the amount of processing is that of performing the brightness detection process on only a subset of the image frames. For example, the brightness detection could be performed for every second or third frame, or any other regular or non-regular distribution of frames.

In some embodiments, performing the brightness variation reducing process on these frames alone may be sufficient—if the number of significant brightness variations is reduced to a below-threshold number (such as fewer than three per second, or any other frequency), this may be considered sufficient to improve user viewing comfort.

Alternatively, this sampling method may be used to identify portions of the content in which significant brightness variations occur—and further identification may be performed in regions in which the variations are identified. This method may be more appropriate in pre-processed content than content which is being processed on-the-fly, however it may still be used in identifying the start of a portion of content comprising significant brightness variations in the latter case. In these on-the-fly embodiments, the processing may be continued until the number of brightness variations decreases again, or any other suitable stopping condition is met, and the sampling method may be continued at that time.

A second example is that of examining only a portion of each of the image frames that is examined to determine the brightness. For example, a fraction of the pixels may be sampled so as to reduce the number of brightness values that are detected. The selection of pixels may be determined freely; for example, every tenth pixel may be sampled, or a region of the image frame may be selected for detection processing. In any case, the pixels that are to be analysed to determine the brightness should be selected so as to be considered representative of the brightness of the overall image.

In some cases, the sampled pixels belong to a central region of the image frame; for example, a 640×480 or 1280×960 region centred upon the middle of an image frame. The middle of the image frame may be considered to be representative of the frame as a whole, as video capture is often performed by placing the focus of the image frame in the middle—that is, the most important elements of the image are often found there. Any brightness variation is likely to be detectable from this region, in many cases.

In some embodiments, the area of the display upon which the viewer is focused may be able to be detected—for example, via a gaze-detection arrangement. In such embodiments, it may be appropriate to select the image frame portion to be sampled in dependence upon this detection. That is to say, the region of focus in the displayed image may be used as the area to which the brightness detection is performed in subsequent frames.

While it may be advantageous to reduce the amount of processing that is performed, in some cases it may be preferable to not perform the processing at all. For example, the detection processing may be entirely wasted in content in which significant variations in brightness do not occur. It may therefore be advantageous to be able to identify when the processing may not be required, or may be of only marginal benefit.

In some embodiments, content may be provided with an indication (for example, in associated metadata) of the maximum brightness variation between frames, and/or information about the frequency of brightness variations (for example, the frequency of brightness variations with a magnitude equal to or greater than a threshold value). If the information indicates that the brightness variations would likely be acceptable to a user, for example based upon predetermined values or user profile information, then the brightness variation reducing processing may be omitted for that content.

In some embodiments, it may the case that one or more aspects of the content are able to be identified, and it may be determined based upon one or more of these aspects as to whether to perform the processing.

For example, content may be 'certified' or have some other indication that it has been modified (or requires no further modification) so as to be suitable for viewing in respect of at least the brightness variations between frames.

Another aspect that may be considered is that of the events or the like that are shown in the content. For example, tags may be provided with the content that indicate what is shown (such as a particular event, or type of event), or an identification process may be performed by the content reproduction device so as to identify the content—for example, utilising a machine learning method that has been trained so as to identify the context of the content. For instance, if it is identified that the content relates to a scene taking place on a beach, it may be considered unlikely that significant brightness variations would exist—and in such a case, reduced processing may be performed (for example, a sampling method as discussed above), or the processing may be omitted altogether. Alternatively, if it is identified that the content relates to a scene taking place on the red carpet at a movie premiere, it would be considered likely that brightness variations would exist (such as from camera flashes) and as such the brightness variation reducing process should be applied.

Rather than being dependent only upon the content, it is also considered that the processing may be performed selectively in dependence upon the content reproduction system. For example, a device with reduced processing power (such as a tablet computer, relative to a games console), the amount of processing that is applied may be reduced or the conditions for omitting the processing may be relaxed. Other variables such as remaining battery power may also be considered.

Similarly, the display configuration may also be considered. For instance, a display arrangement comprising a small television may be operable to implement the brightness variation reduction less often (or not at all) than a display arrangement comprising a head-mountable display that occupies the entirety of the user's field of view. This is in view of the fact that the small device further away is likely to have a mitigated impact on the viewer's vision relative to the head-mountable display, and as such the impact on the user's viewing comfort is likely to be reduced.

Figure 7:
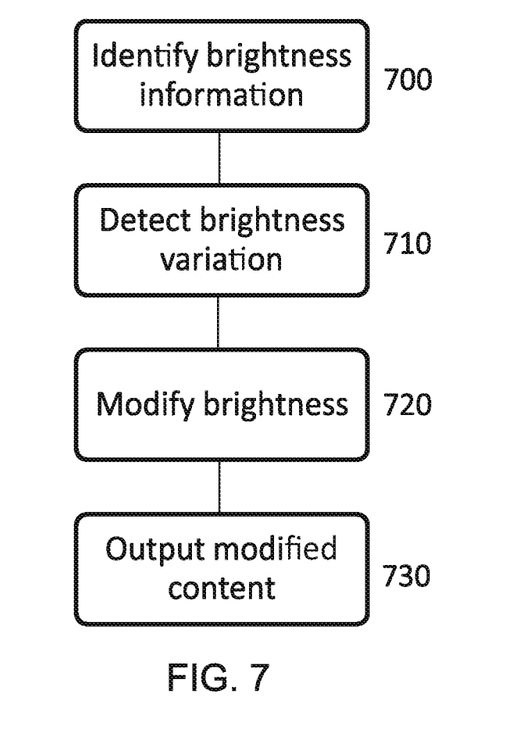
FIG. 7 schematically illustrates a content processing method.

FIG. 7 schematically illustrates a content processing method for modifying the brightness of one or more image frames of content.

A step 700 comprises identifying brightness information for each of two or more image frames within the content.

A step 710 comprises detecting a variation in the brightness of at least two image frames within the content.

A step 720 comprises modifying the brightness of one or more image frames in dependence upon the detected brightness variation so as to reduce the variation in brightness between frames of the content.

An optional step 730 comprises outputting the modified content generated in step 720 to a display, transmitting the content, or storing the content for later use.

Figure 8:
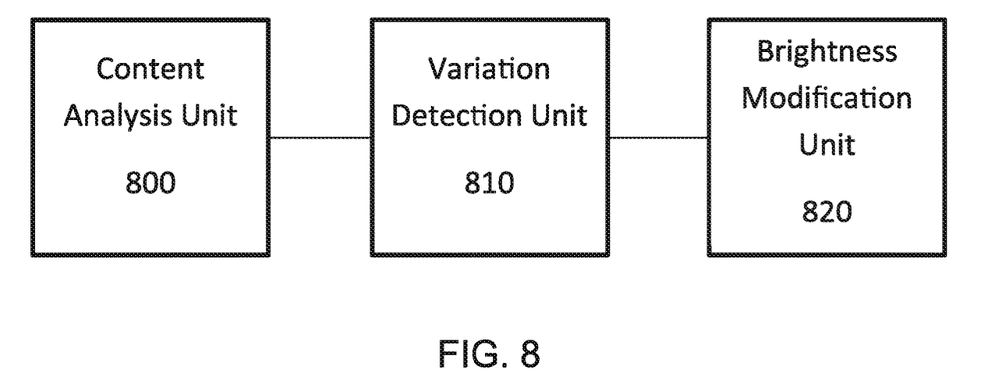
FIG. 8 schematically illustrates a content processing system.

FIG. 8 schematically illustrates a content processing system for modifying the brightness of one or more image frames of content. The system comprises a content analysis unit 800, a variation detection unit 810, and a brightness modification unit 820. Of course, further functional units may be provided—such as one or more output units operable to transmit the modified content to a storage unit, another device, or to a display.

The content analysis unit 800 is operable to identify brightness information for each of two or more image frames within the content. In some embodiments, the content analysis unit 800 is operable to analyse at least a portion of an image frame to identify brightness information; for example, this may comprise the whole of an image frame, or only a subsection (such as a number of pixels or a particular region of the image frame). Alternatively, or in addition, brightness information may be obtained from associated metadata or any other suitable source. The content analysis unit 800 may also be operable to identify an average brightness of two or more image frames within the content; the average may be a rolling average generated from a selection of image frames preceding a given image frame, for example.

In some embodiments, the content analysis unit 800 is operable to identify brightness information for content in dependence upon either or both of the source of the content and the subject matter of the content. This may result in a variation of the identification process, for example when it is performed in the image frame generation pipeline, whether the processing is performed, and/or how the brightness information is obtained.

In some cases, brightness information may be provided with the content; in those cases, the content analysis unit is operable to identify brightness information from metadata or the like (as described above). However, in other embodiments the content analysis unit is operable to identify brightness information of the content during playback of the content—although of course, this could refer to identifying the information from metadata in real time. An example of this is the provision of brightness information in a separate time track associated with the content—it may be appropriate to analyse such information in real-time as the content is played back.

The variation detection unit 810 is operable to detect a variation in the brightness of at least two image frames within the content. In some embodiments the variation detection unit 810 is operable to detect a variation in the brightness of two or more consecutive frames within the content, while in others it is possible that variations are detected between every second or third frame, or with any other suitable degree of granularity.

The brightness modification unit 820 is operable to modify the brightness of one or more image frames in dependence upon the detected brightness variation so as to reduce the variation in brightness between frames of the content.

For example, the brightness modification unit 820 may be operable to modify the brightness of one or more image frames so as to reduce the difference between the image frame brightness and the average brightness. In particular, where appropriate, the brightness modification unit 820 can be operable to modify the brightness of image frames with a brightness value that is greater than or equal to an upper threshold brightness value, or lower than or equal to a lower threshold brightness value.

In some embodiments, the brightness modification unit 820 may be operable to apply a brightness modification to an image frame in dependence upon the magnitude of the brightness of the image frame. Alternatively, or in addition, the brightness modification unit 820 may be operable to apply a brightness modification to an image frame in dependence upon the magnitude of the brightness difference between the image frame and the average brightness. As a further alternative or additional example of processing, the brightness modification unit 820 may be operable to modify the contrast value of one or more image frames.

The arrangement of FIG. 8 is an example of a processor (for example, a processing unit located in a games console, server, or content playback device) that is operable to modify the brightness of one or more image frames of content, and in particular the processor is operable to:

identify brightness information for each of two or more image frames within the content;

detect a variation in the brightness of at least two image frames within the content; and modify the brightness of one or more image frames in dependence upon the detected brightness variation so as to reduce the variation in brightness between frames of the content.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A content processing apparatus for modifying the brightness of one or more image frames of content, the system comprising:

a content analysis unit operable to identify brightness information for each of two or more image frames within the content during playback of the content;

a variation detection unit operable to detect a variation in the brightness of at least two image frames within the content during playback of the content; and a brightness modification unit operable to modify the brightness of one or more image frames in dependence upon the detected brightness variation so as to reduce the variation in brightness between frames of the content during playback of the content, wherein the brightness modification unit is operable to modify the brightness of one or more image frames so as to reduce a difference between the image frame brightness and an average brightness, and the brightness modification unit is operable to apply a brightness modification to an image frame in dependence upon the magnitude of the brightness of the image frame.

2. The apparatus of claim 1, wherein the content analysis unit is operable to analyse at least a portion of an image frame to identify brightness information.

3. The apparatus of claim 1, wherein the content analysis unit is operable to identify brightness information for content in dependence upon either or both of the source of the content and the subject matter of the content.

4. The apparatus of claim 1, wherein the content analysis unit is operable to identify an average brightness of two or more image frames within the content.

5. The apparatus of claim 4, wherein the average is a rolling average generated from a selection of image frames preceding a given image frame.

6. The apparatus of claim 4, wherein the variation detection unit is operable to detect a variation in the brightness of two or more consecutive frames within the content.

7. The apparatus of claim 1, wherein the brightness modification unit is operable to modify the brightness of image frames with a brightness value that is greater than or equal to an upper threshold brightness value, or lower than or equal to a lower threshold brightness value.

8. The apparatus of claim 1, wherein the brightness modification unit is operable to apply a brightness modification to an image frame in dependence upon the magnitude of the brightness difference between the image frame and the average brightness.

9. The apparatus of claim 1, wherein the brightness modification unit is operable to modify a contrast value of one or more image frames.

10. A content processing method for modifying the brightness of one or more image frames of content, the method comprising executing computer software on a computer to cause the computer to carry out actions, comprising:

identifying brightness information for each of two or more image frames within the content during playback of the content;

detecting a variation in the brightness of at least two image frames within the content during playback of the content; and modifying the brightness of one or more image frames in dependence upon the detected brightness variation so as to reduce the variation in brightness between frames of the content during playback of the content, wherein the modifying the brightness includes modifying the brightness of one or more image frames so as to reduce a difference between the image frame brightness and an average brightness, and the modifying the brightness includes modifying a brightness of an image frame in dependence upon the magnitude of the brightness of the image frame.

11. A non-transitory machine-readable storage medium which stores computer software which, when executed by a computer, causes the computer to perform a method for modifying the brightness of one or more image frames of content, the method comprising:
- identifying brightness information for each of two or more image frames within the content during playback of the content;
- detecting a variation in the brightness of at least two image frames within the content during playback of the content; and
- modifying the brightness of one or more image frames in dependence upon the detected brightness variation so as to reduce the variation in brightness between frames of the content during playback of the content, wherein
- the modifying the brightness includes modifying the brightness of one or more image frames so as to reduce a difference between the image frame brightness and an average brightness, and
- the modifying the brightness includes modifying a brightness of an image frame in dependence upon the magnitude of the brightness of the image frame.

\* \* \* \* \*